(12) United States Patent
Mukherjee et al.

(10) Patent No.: US 11,323,515 B2
(45) Date of Patent: May 3, 2022

(54) METHOD AND SYSTEM FOR CACHE DATA ANALYSIS FOR ENTERPRISE CONTENT MANAGEMENT SYSTEMS

(71) Applicant: Open Text Corporation, Waterloo (CA)

(72) Inventors: Gourav Mukherjee, Bangalore (IN); Venkatesh Giriyappa, Bangalore (IN); Saurav Choudhuri, Bangalore (IN); Ravi Ranjan Jha, Bangalore (IN)

(73) Assignee: Open Text Corporation, Waterloo (CA)

( * ) Notice: Subject to any disclaimer, the term of this patent is extended or adjusted under 35 U.S.C. 154(b) by 0 days.

(21) Appl. No.: 17/214,475

(22) Filed: Mar. 26, 2021

(65) Prior Publication Data

US 2021/0218810 A1    Jul. 15, 2021

Related U.S. Application Data

(63) Continuation of application No. 16/694,629, filed on Nov. 25, 2019, now Pat. No. 10,965,754, which is a continuation of application No. 16/113,537, filed on Aug. 27, 2018, now Pat. No. 10,498,826, which is a continuation of application No. 14/036,174, filed on Sep. 25, 2013, now Pat. No. 10,091,292.

(51) Int. Cl.
*H04L 29/08* (2006.01)
*H04L 67/1097* (2022.01)

(52) U.S. Cl.
CPC ............... *H04L 67/1097* (2013.01)

(58) Field of Classification Search
CPC ... H04L 67/1097; H04L 67/2842; G06F 9/46; G06Q 30/0631
See application file for complete search history.

(56) References Cited

U.S. PATENT DOCUMENTS

| | | |
|---|---|---|
| 7,089,246 B1 | 8/2006 | O'Laughlen |
| 7,451,225 B1 * | 11/2008 | Todd ................... G06F 12/0862 709/229 |
| 8,145,636 B1 | 3/2012 | Jeh et al. |
| 10,091,292 B1 | 10/2018 | Mukherjee |
| 10,498,826 B2 | 12/2019 | Mukherjee |
| 10,965,754 B2 | 3/2021 | Mukherjee |

(Continued)

OTHER PUBLICATIONS

Office Action for U.S. Appl. No. 14/036,174, dated Sep. 14, 2015, 23 pgs.

(Continued)

*Primary Examiner* — Wing F Chan
*Assistant Examiner* — Billy H Ng
(74) *Attorney, Agent, or Firm* — Sprinkle IP Law Group

(57) ABSTRACT

Content categories are identified based on content provided by a server associated with an enterprise content management system. Using the relationship database, a content category is identified based on content associated with a client associated with a user, the content associated with the client associated with the user including content accessed by the user. A document associated with the content category is identified. A message is sent from the server to the client associated with the user to suggest to the user the document associated with the content category.

21 Claims, 3 Drawing Sheets

(56) References Cited

U.S. PATENT DOCUMENTS

| | | | |
|---|---|---|---|
| 2002/0120564 A1* | 8/2002 | Strietzel | G06Q 20/102 |
| | | | 705/40 |
| 2002/0188694 A1 | 12/2002 | Yu | |
| 2002/0198953 A1 | 12/2002 | O'Rourke et al. | |
| 2005/0033657 A1* | 2/2005 | Herrington | G06Q 30/0631 |
| | | | 705/26.7 |
| 2006/0004850 A1 | 1/2006 | Chowdhury | |
| 2006/0155438 A1 | 7/2006 | Tsunoda et al. | |
| 2006/0200445 A1* | 9/2006 | Chen | G06Q 30/0185 |
| 2007/0011155 A1 | 1/2007 | Sarkar | |
| 2007/0101061 A1 | 5/2007 | Baskaran et al. | |
| 2007/0294367 A1 | 12/2007 | Akiyama | |
| 2009/0041036 A1 | 2/2009 | Batz et al. | |
| 2012/0191715 A1* | 7/2012 | Ruffner | G06F 16/93 |
| | | | 707/738 |
| 2013/0138795 A1 | 5/2013 | Field et al. | |
| 2013/0212109 A1 | 8/2013 | Evancich et al. | |
| 2013/0332842 A1* | 12/2013 | Bernhardsson | H04L 67/02 |
| | | | 715/738 |
| 2014/0222988 A1 | 8/2014 | Shlomo et al. | |
| 2014/0229523 A1 | 8/2014 | Ozawa | |
| 2014/0282230 A1 | 9/2014 | Sorin | |
| 2015/0039784 A1* | 2/2015 | Westphal | H04L 45/42 |
| | | | 709/240 |
| 2015/0046442 A1 | 2/2015 | Bannur et al. | |
| 2020/0092372 A1 | 3/2020 | Mukherjee | |

OTHER PUBLICATIONS

Office Action for U.S. Appl. No. 14/036,174, dated Mar. 9, 2016, 29 pgs.

Office Action for U.S. Appl. No. 14/036,174, dated Sep. 20, 2016, 26 pgs.

Office Action for U.S. Appl. No. 14/036,174, dated Mar. 15, 2017, 20 pgs.

Office Action for U.S. Appl. No. 14/036,174, dated Jul. 12, 2017, 20 pgs.

Office Action for U.S. Appl. No. 14/036,174, dated Jan. 18, 2018, 19 pgs.

Office Action for U.S. Appl. No. 16/113,537, dated Feb. 28, 2019, 40 pgs.

\* cited by examiner ent system enhances document security, and provides metrics to help measure productivity and identify efficiency. An enterprise content management system provides integrated solutions for multiple departments and systems, as many documents may cross multiple departments and affect multiple processes. For example, imaging, document management, and workflow can be combined in a customer service department to enable customer service agents to better resolve customer inquiries. Likewise, an accounting department may access supplier invoices from an electronic resource management system, access purchase orders from an imaging system, and access contracts from a document management system as part of an approval workflow. Similarly, an organization may present information via the World Wide Web, which requires managing web content.

METHOD AND SYSTEM FOR CACHE DATA ANALYSIS FOR ENTERPRISE CONTENT MANAGEMENT SYSTEMS

CROSS-REFERENCE TO RELATED APPLICATION(S)

This application is a continuation of, and claims a benefit of priority under 35 U.S.C. 120 of the filing date of U.S. patent application Ser. No. 16/694,629, filed Nov. 25, 2019, entitled "METHOD AND SYSTEM FOR CACHE DATA ANALYSIS FOR ENTERPRISE CONTENT MANAGEMENT SYSTEMS," issued as U.S. Pat. No. 10,965,754, which is a continuation of, and claims a benefit of priority under 35 U.S.C. 120 of the filing date of U.S. patent application Ser. No. 16/113,537, filed Aug. 27, 2018, entitled "METHOD AND SYSTEM FOR CACHE DATA ANALYSIS FOR ENTERPRISE CONTENT MANAGEMENT SYSTEMS," issued as U.S. Pat. No. 10,498,826, which is a continuation of, and claims a benefit of priority under 35 U.S.C. 120 of the filing date of U.S. patent application Ser. No. 14/036,174, filed Sep. 25, 2013, issued as U.S. Pat. No. 10,091,292, entitled "METHOD AND SYSTEM FOR CACHE DATA ANALYSIS FOR ENTERPRISE CONTENT MANAGEMENT SYSTEMS," the entire contents of which are hereby expressly incorporated by reference for all purposes.

BACKGROUND

An enterprise content management system provides online access to content stored using digital technology, information formerly available only on paper, microfilm, or microfiche. An enterprise content management system generates new metadata about content as the content is checked in and out. Information about how and when content is used can enable an enterprise content management system to acquire new filtering, routing and search pathways, and retention-rule decisions. An enterprise content management system provides access to data about email and instant messaging, which may be used in business decisions. The audit trail generated by an enterprise content management

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

A typical deployment of an enterprise content management system includes a centralized content server that manages all content, an application that provides a user interface to the content, and several cache servers which serve as caching repositories for serving and ingesting content closer to users based on their geographies, with some enterprises using as many as 100 cache servers located all over the world. A user who requests a document via their geographically-based cache server may experience lag time in receiving one document of millions of documents managed by a centralized content server that is located on the other side of the planet because their geographically-based cache server has not already cached that document.

Embodiments herein provide cache data analysis for enterprise content management systems. A content category is identified based on content provided by a cache server associated with an enterprise content management system. For example, a cache server analyzer analyzes the content that a cache server located in Bangalore, India, provides in responding to user requests, which results in caching documents that are related to accounting more often than a provision threshold, such as 25% of the time. A determination is made whether content associated with the content category is cached by the cache server. For example, the cache server analyzer determines whether all of the accounting documents managed by a content server located in Boston, Mass., are cached by the cache server in Bangalore, India. The content associated with the content category is requested by the cache server if the content associated with the content category is not cached by the cache server. For example, the cache server analyzer requests any of the accounting documents managed by the content server in Boston, Mass., which are not cached by the cache server located in Bangalore, India. The content associated with the content category is cached by the cache server. For example, the cache server in Bangalore, India caches any of the accounting documents managed by the content server in Boston, Mass., which were not already cached by the cache server in Bangalore, India. The cache server pre-caches content likely to be requested by its geographically based users before the content is actually requested by its geographically based users, thereby significantly reducing the lag time experienced by these users when they request the content that they are likely to request.

Figure 1:
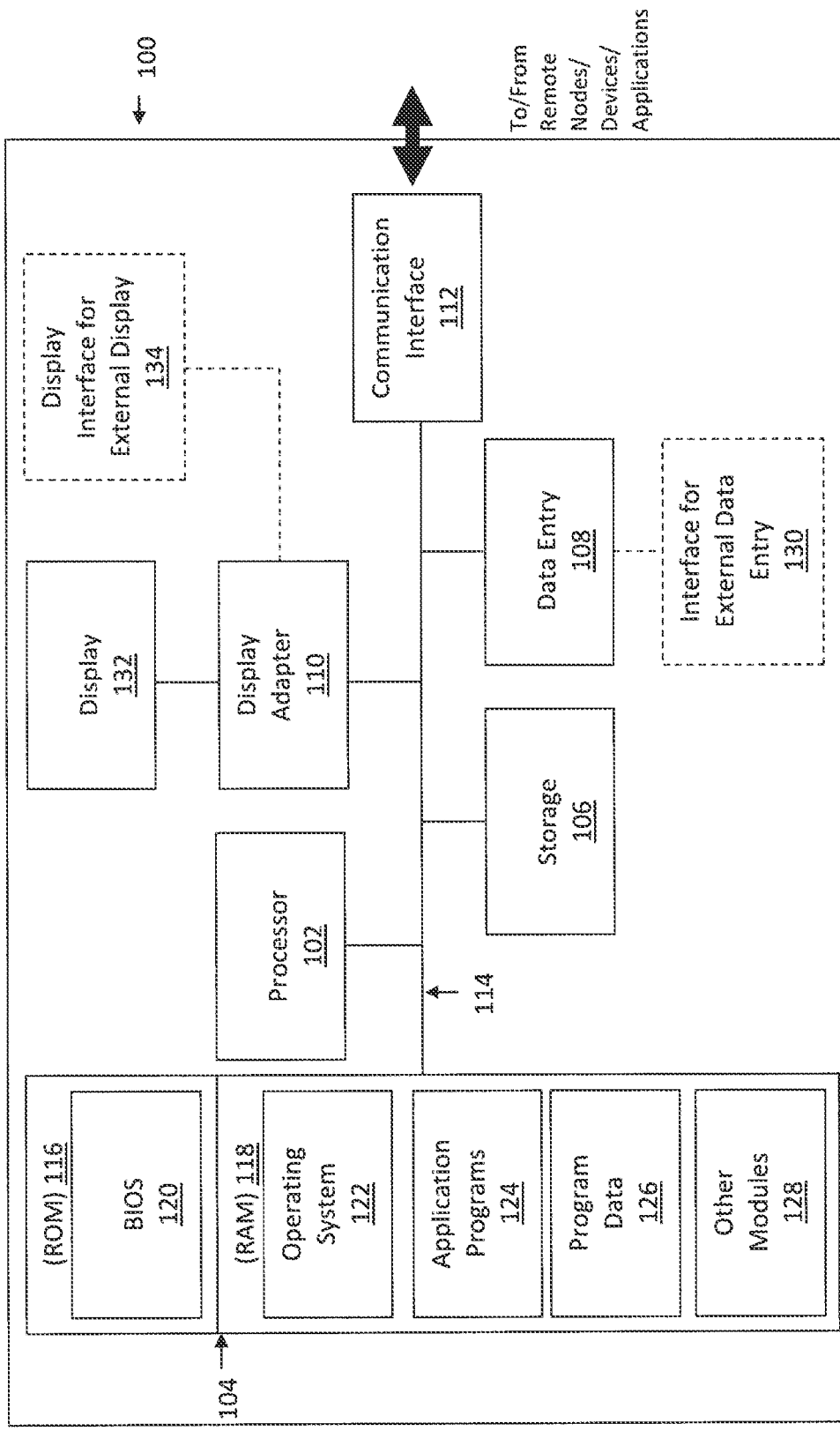
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static RAM (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a compact disc (CD) ROM, digital versatile disc (DVD) or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable CD, a portable DVD, a high-definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for cloning enterprise management systems.

In the prior art, a user who requests a document via their geographically-based cache server may experience lag time in receiving one document of millions of documents managed by a centralized content server that is located on the other side of the planet because their geographically-based cache server has not already cached that document. Embodiments herein provide cache data analysis for enterprise content management systems. A cache server pre-caches content likely to be requested by its geographically based users before the content is actually requested by its geographically based users, thereby significantly reducing the lag time experienced by these users when they request the content that they are likely to request.

Figure 2:
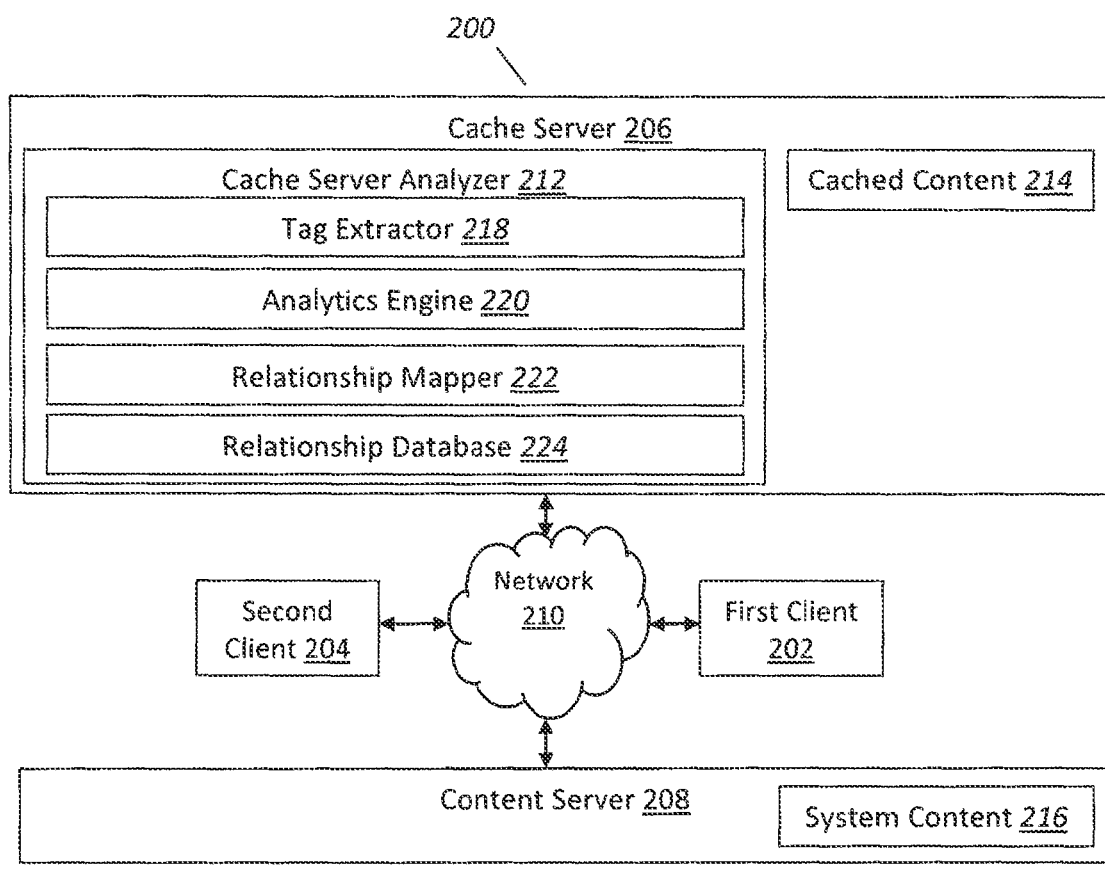
FIG. 2 illustrates a block diagram of an example system for cache data analysis for enterprise content management systems, under an embodiment.

FIG. 2 illustrates a block diagram of a system that implements cache data analysis for enterprise management systems, under an embodiment. As shown in FIG. 2, system 200 may illustrate a cloud computing environment in which data, applications, services, and other resources are stored and delivered through shared data centers and appear as a single point of access for the users. The system 200 may also represent any other type of distributed computer network environment in which servers control the storage and distribution of resources and services for different client users.

In an embodiment, the system 200 represents a cloud computing system that includes a first client 202, and a second client 204; and a cache server 206 and a content server 208 that are provided by a hosting company. The clients 202-204 and the servers 206-208 communicate via a network 210. The cache server 206 includes a cache server analyzer 212 and cached content 214, and the content server 208 accesses system content 216. The cache server analyzer 212 may include a tags extractor 218, an analytics engine 220, a relationship mapper 222, and a relationship database 224. The function of the cache server analyzer 212 may be divided into fewer elements than the elements 218-224 or more elements than the elements 218-224. Although the cache server analyzer 212 and its elements 218-224 are depicted as residing completely on the cache server 206, the cache server analyzer 212 and its elements 218-224 may reside in any combination of completely or partially on the cache server 206, the content server 208, and/or other servers that are not depicted in FIG. 2. Although FIG. 2 depicts only two clients 202-204, two servers 206-208, one network 210, one cache server analyzer 212, and one each of the elements 218-224 for the purposes of presenting an extremely simplified example, the system 200 may include any number of clients 202-204, servers 206-208, networks 210, cache server analyzers 212, and elements 218-224. The clients 202-204 and the servers 206-208 may each be substantially similar to the system 100 depicted in FIG. 1.

A cache server analyzer identifies a content category based on content provided by a cache server associated with an enterprise content management system. For example, after the cache server 206 stores content as the cached content 214, the tag extractor 218 processes the content (synchronously or asynchronously) and parses the content into tokens. For example, the tag extractor 218 parses content in a document into tokens such as "invoice," "payment," "is," "due," "upon," and "receipt," with the token "invoice" tagged as a keyword. The analytics engine 220 uploads the tags and tokens, along with some information about the cache server 206, the user associated with the first client 202 that requested the content, and some metadata to identify the content itself. The analytics engine 220 analyzes the tags, tokens, information, and metadata, and feeds this data to the relationship mapper 222. The relationship mapper 222 creates relationships based on the tags, tokens, information, and metadata, and stores the relationships, tags, tokens, information, and metadata in the relationship database 224. The relationship mapper 222 also updates the cache server 206 with information about the cached content 214, such as more than 25% of the cached content 214 includes accounting documents. The relationship database 224 is also accessible to the content server 208 located in Boston, Mass. In this example, the cache server 206 located in Bangalore, India, responds to user requests by caching documents that are related to accounting more often than a provision threshold, such as 25% of the time.

The cache server analyzer determines whether content associated with the content category is cached by the cache server. For example, the content server 206 in Boston, Mass., has analyzed the content in the system content 216, and thereby identified content categories for documents, such as accounting, customer service, human resources, web design, engineering, and legal. The cache server analyzer 212 determines whether all of the accounting documents managed by the content server 208 in Boston, Mass., are cached by the cache server 206 in Bangalore, India.

The cache server requests content associated with the content category if the content associated with the content category is not cached by the cache server. For example, the cache server analyzer 212 requests any of the accounting documents managed by the content server 208 in Boston, Mass. that are not already cached by the cache server 206 in Bangalore, India. The cache server 206 may also communicate with other cache servers to receive content associated with the content category, which is parked on the other cache servers but not yet uploaded to the content server 208. The cache server 206 may request the likely content periodically to ensure that the cached content 214 is the most recent version of the corresponding documents. Alternatively, or additionally, the cache server 206 may use the cached content 214 to provide a requested document to a requesting user, and then confirm with the content server 208 that the document provided to the user is the most recent version of the document while the user accesses the document.

The cache server caches the content associated with the content category. For example, the cache server 206 in Bangalore, India caches any of the accounting documents managed by the content server 208 in Boston, Mass., which were not already cached by the cache server 206 in Bangalore, India. The cache server 206 pre-caches content likely to be requested by its geographically based users before the content is actually requested by its geographically based users, thereby significantly reducing the lag time experienced by these users when they request the content that they are likely to request.

The cache server analyzer may identify a content category based on content associated with a client associated with a user. For example, the cache server analyzer 212 analyzes that a user located in Delhi, India, requests documents that are related to accounting more often than an association threshold, such as 50% of the time. The cache server analyzer 212 may create a user profile based on the content categories accessed by a user. For example, the cache server analyzer 212 creates a graph database that maintains the relationship between a user, content accessed by the user, other users who access the same content, and other content accessed by the other users. The nodes of the graph database can be the tags created by the tag extractor 218 and the users identified by the analytics engine 220. The edges in the graph database are the relations between various nodes, such as tags and users. The cache server analyzer 212 can also use the tags to determine relationships between nodes in the graph database, users and other tags.

The cache server analyzer may send a message to a client to suggest content associated with the content category. For example, the cache server analyzer 212 sends a message to the first client 202 for the accounting user in Delhi, India, to suggest selecting any of the accounting documents that were already cached by the cache server 206 in Bangalore, India. In another example, the cache server analyzer 212 sends a message to the first client 202 for the accounting user in Delhi, India, to suggest selecting any of the accounting documents that are available by the content server 208 in Boston, Mass., some of which are yet to be cached by the cache server 206 in Bangalore, India. The cache server analyzer 212 only suggests content to a user based on the user's access levels. For example, accounting documents that are available only to accounting supervisors are not available to the accounting user in Delhi, India if this accounting user does not have access rights at the level of an accounting supervisor or higher. In another example, the relationship database 224 includes a graph which indicates that the users Alice, Bob and Charlie have worked on the same accounting document, so they have a relationship with each other referred to as a "team." When Alice uses her client to access the enterprise content management system, and looks for the accounting documents she previously worked on, the cache server analyzer 212 will also suggest that she consider accessing the documents worked upon by Bob and Charles, as well as other documents which have the tag "accounting."

The cache server analyzer may send a message to the client to suggest content associated with a second content category based on a level of similarity between a user profile, associated with the user, which identifies the content category and a second user profile, associated with a second user, which identifies the second content category based on content associated with a second client associated with the second user. For example, the cache server analyzer 212 sends a message to the first client 202 for the accounting user in Delhi, India, to suggest selecting any of the customer service documents that were already cached by the cache server 206 in Bangalore, India because the user profile of the accounting user is similar in the content accessed to a user profile of another user who accesses customer service documents as well as accounting documents. The cache server analyzer 212 can use the structures of the graph database to analyze relations between users and tags so that two similar users, based on their access levels, can be suggested to select content accessed by the other user. The cache server 206 may allocate memory for its cached content 214 based on analysis of cached content categories. For example, 25% of the documents cached by the cache server 206 in Bangalore, India, are accounting documents and 20% of the documents cached are customer service documents. Therefore, the cache server 206 allocates 25% of its memory to pre-cache accounting documents and 20% of its memory to pre-cache customer service documents, but the allocation percentages do not have to match the caching percentages.

Embodiments herein enable cache data analysis for enterprise content management systems. The cache server 206 pre-caches content likely to be requested by its geographically based users before the content is actually requested by its geographically based users, thereby significantly reducing the lag time experienced by these users when they request the content that they are likely to request.

Figure 3:
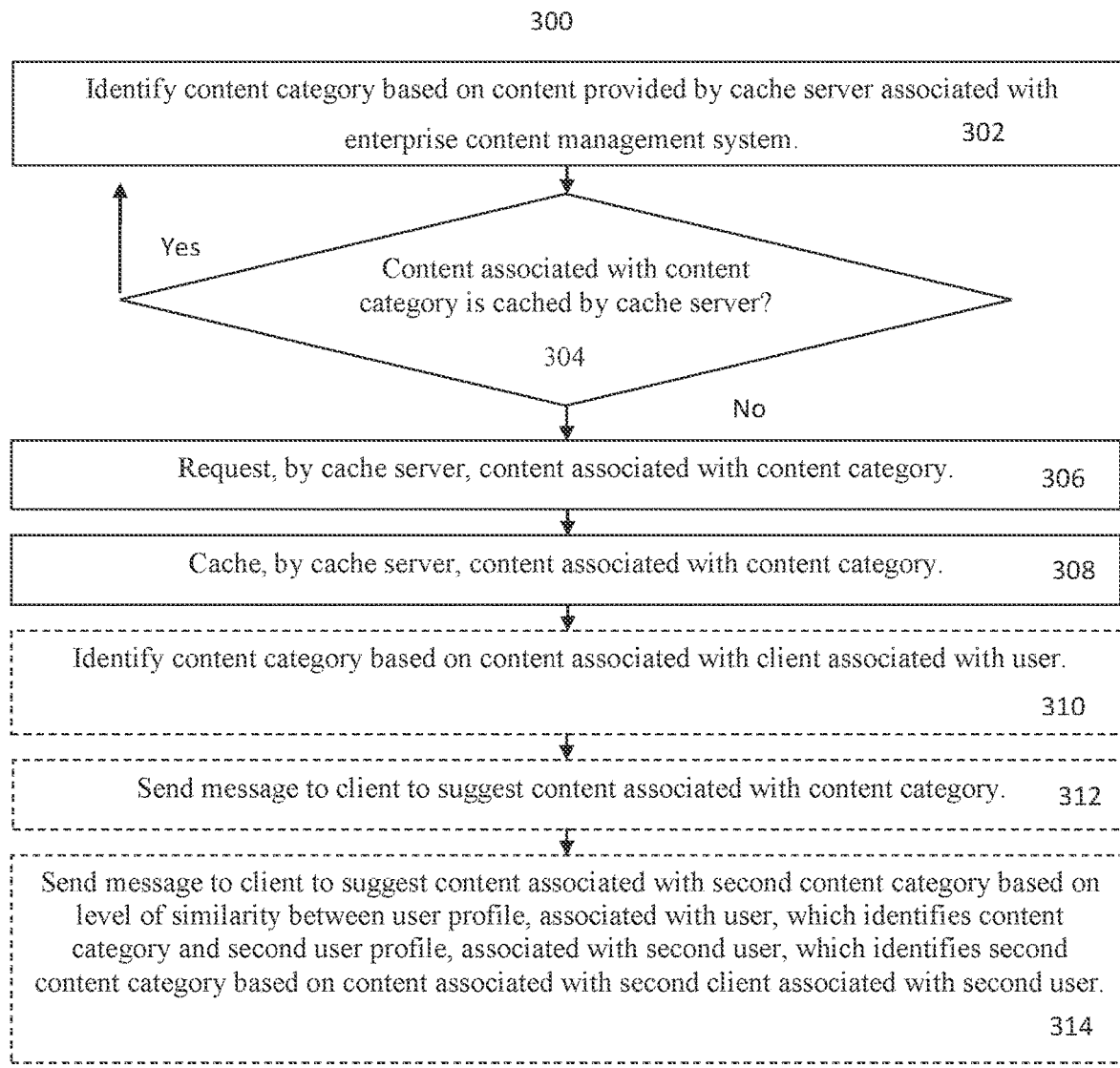
FIG. 3 is a flowchart that illustrates a method for cache data analysis for enterprise content management systems, under an embodiment.

FIG. 3 is a flowchart that illustrates a method of cache data analysis for enterprise content management systems. Flowchart 300 illustrates method acts illustrated as flowchart blocks for certain steps involved in and/or between the clients 202-204 and/or the servers 206-208 of FIG. 2.

A content category is identified based on content provided by a cache server associated with an enterprise content management system, act 302. For example, a cache server analyzer 212 analyzes the content that a cache server 206 in Bangalore, India, provides in responding to user requests by caching documents which are related to accounting more often than a provision threshold, such as 25% of the time.

A determination is made whether content associated with a content category is cached by a cache server, act 304. For example, the cache server analyzer 212 determines whether all of the accounting documents managed by the content server 208 in Boston, Mass., are cached by the cache server 206 in Bangalore, India. If all of the content associated with a content category is cached by a cache server, the method 300 restarts at act 302. If some of the content associated with a content category is not cached by a cache server, the method 300 continues to act 306.

Content associated with a content category is requested by a cache server if the content associated with the content category is not cached by the cache server, act 306. For example, the cache server analyzer 212 requests any of the accounting documents managed by the content server 208 in Boston, Mass., which are not cached by the cache server 206 in Bangalore, India.

Content associated with a content category is cached by a cache server, act 308. For example, the cache server 206 in Bangalore, India caches any of the accounting documents managed by the content server 208 in Boston, Mass., which were not already cached by the cache server 206 in Bangalore, India.

A content category is optionally identified based on content associated with a client associated with a user, act 310. For example, the cache server analyzer 212 analyzes that a user in Delhi, India, requests documents that are related to accounting more often than an association threshold, such as 50% of the time.

A message is optionally sent to a client to suggest content associated with content category, act 312. For example, the cache server analyzer 212 sends a message to the first client 202 for the accounting user in Delhi, India, to suggest selecting any of the accounting documents that were already cached by the cache server 206 in Bangalore, India.

A message is optionally sent to a client to suggest content associated with a second content category based on a level of similarity between a user profile, associated with a user, which identifies a content category, and a second user profile, associated with a second user, which identifies the second content category based on content associated with a second client associated with the second user, act 314. For example, the cache server analyzer 212 sends a message to the first client 202 for the accounting user in Delhi, India, to suggest selecting any of the customer service documents that were already cached by the cache server 206 located in Bangalore, India, because the user profile of the accounting user is similar in the content accessed to a user profile of another user who accesses customer service documents as well as accounting documents.

Although FIG. 3 depicts the acts 302-314 occurring in a specific order, the acts 302-314 may occur in another order. Embodiments herein enable cache data analysis for enterprise content management systems. The cache server 206 pre-caches content likely to be requested by its geographically based users before the content is actually requested by its geographically based users, thereby significantly reducing the lag time experienced by these users when they request the content that they are likely to request.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter, and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for provisioning content, the system comprising:
   a processor;
   a non-transitory, computer-readable medium storing a processor-based application, the processor-based application including instructions that are executable by the processor to:
   provide, by a first server associated with an enterprise content management system, documents in response to user requests;
   identify content categories associated with the documents provided by the first server, wherein identifying the content categories comprises parsing the documents provided by the first server and extracting tags corresponding to the content categories from the documents provided by the first server;
   store, in a relationship database, the extracted tags, user information about users associated with clients that requested the documents provided by the first server, and relationships between the tags and the user information;
   identify, using the tags, the user information and the relationships stored in the relationship database, a first content category based on content associated with a client associated with a first user, the content associated with the client associated with the first user including first content accessed by the first user;
   identify a first document associated with the first content category, and not part of the first content accessed by the first user; and
   send a message from the first server to the client associated with the first user to suggest the first document associated with the first content category to the first user.

2. The system for provisioning content of claim 1, wherein identifying the first document comprises identifying the first document based on a user-access level of the first user.

3. The system for provisioning content of claim 1, wherein identifying the first content category comprises determining that the first user requested documents associated with the first content category more than an association threshold.

4. The system for provisioning content of claim 1, wherein the processor-based application comprises instructions executable to:
maintain a relationship between the first user, the first content accessed by the first user, a second user who accessed the first content, and second content accessed by the second user; and
identify the first document based on the relationship.

5. The system for provisioning content of claim 4, wherein identifying the first document is based on determining from the relationship that the first user and the second user accessed a second document associated with the first content category and that the second user accessed the first document.

6. The system for provisioning content of claim 4, wherein identifying the first content category comprises determining that the first user and second user accessed content associated with a second content category and the second user accessed content associated with the first content category.

7. The system for provisioning content of claim 1, wherein the processor-based application comprises instructions executable to:
pre-allocate memory at the first server to store content related to the first content category based on an analysis of the identified content categories;
determine that the first server responded to the user requests with documents that are related to the first content category more often than a provision threshold;
based on a determination that there are additional documents associated with the first content category stored by a content server and not stored by the first server, request, by the first server, the additional documents associated with the first content category from the content server.

8. A computer program product comprising a non-transitory, computer-readable medium storing a set of the computer-executable instructions, the set of computer-executable instructions comprising instructions for:
providing, by a first server associated with an enterprise content management system, documents in response to user requests;
identifying content categories associated with the documents provided by the first server, wherein identifying the content categories comprises parsing the documents provided by the first server and extracting tags corresponding to the content categories from the documents provided by the first server;
storing, in a relationship database, the extracted tags, user information about users associated with clients that requested the documents provided by the first server, and relationships between the tags and the user information;
identifying, using the tags, the user information and the relationships stored in the relationship database, a first content category based on content associated with a client associated with a first user, the content associated with the client associated with the first user including first content accessed by the first user;
identifying a first document associated with the first content category, and not part of the first content accessed by the first user; and
sending a message from the first server to the client associated with the first user to suggest the first document associated with the first content category to the first user.

9. The computer program product of claim 8, wherein identifying the first document comprises identifying the first document based on a user-access level of the first user.

10. The computer program product of claim 8, wherein identifying the first content category comprises determining that the first user requested documents associated with the first content category more than an association threshold.

11. The computer program product of claim 8, wherein the set of computer executable instructions further comprises instructions for:
maintaining a relationship between the first user, the first content accessed by the first user, a second user who accessed the first content, and second content accessed by the second user; and
identifying the first document based on the relationship.

12. The computer program product of claim 11, wherein identifying the first document is based on determining from the relationship that the first user and the second user accessed a second document associated with the first content category and that the second user accessed the first document.

13. The computer program product of claim 11, wherein identifying the first content category comprises determining that the first user and second user accessed content associated with a second content category and the second user accessed content associated with the first content category.

14. The computer program product of claim 8, wherein the set of computer-executable instructions further comprises instructions for:
pre-allocating memory at the first server to store content related to the first content category based on an analysis of the identified content categories;
determining that the first server responded to the user requests with documents that are related to the first content category more often than a provision threshold;
based on a determination that there are additional documents associated with the first content category stored by a content server and not stored by the first server, requesting, by the first server, the additional documents associated with the first content category from the content server.

15. A method for provisioning content, the method comprising:
providing, by a first server associated with an enterprise content management system, documents in response to user requests;
identifying content categories associated with the documents provided by the first server, wherein identifying the content categories comprises parsing the documents provided by the first server and extracting tags corresponding to the content categories from the documents provided by the first server;
storing, in a relationship database, the extracted tags, user and information about users associated with clients that requested the documents provided by the first server, and relationships between the tags and the user information;
identifying, using the tags, the user information and the relationships stored in the relationship database, a first content category based on content associated with a client associated with a first user, the content associated with the client associated with the first user including first content accessed by the first user;

identifying a first document associated with the first content category, and not part of the first content accessed by the first user; and sending a message from the first server to the client associated with the first user to suggest the first document associated with the first content category to the first user.

16. The method of claim 15, wherein identifying the first document comprises identifying the first document based on a user-access level of the first user.

17. The method of claim 15, wherein identifying the first content category comprises determining that the first user requested documents associated with the first content category more than an association threshold.

18. The method of claim 15, wherein the set of computer executable instructions further comprises instructions for:

maintaining a relationship between the first user, the first content accessed by the first user, a second user who accessed the first content, and second content accessed by the second user; and identifying the first document based on the relationship.

19. The method of claim 18, wherein identifying the first document is based on determining from the relationship that the first user and the second user accessed a second document associated with the first content category and that the second user accessed the first document.

20. The method of claim 18, wherein identifying the first content category comprises determining that the first user and second user accessed content associated with a second content category and the second user accessed content associated with the first content category.

21. The method of claim 15, wherein the set of computer-executable instructions further comprises instructions for:

pre-allocating memory at the first server to store content related to the first content category based on an analysis of the identified content categories;

determining that the first server responded to the user requests with documents that are related to the first content category more often than a provision threshold;

based on a determination that there are additional documents associated with the first content category stored by a content server and not stored by the first server, requesting, by the first server, the additional documents associated with the first content category from the content server.

* * * * *